L. W. OSTMANN.
CUSHION TIRE.
APPLICATION FILED AUG. 11, 1919.
1,343,154.
Patented June 8, 1920.
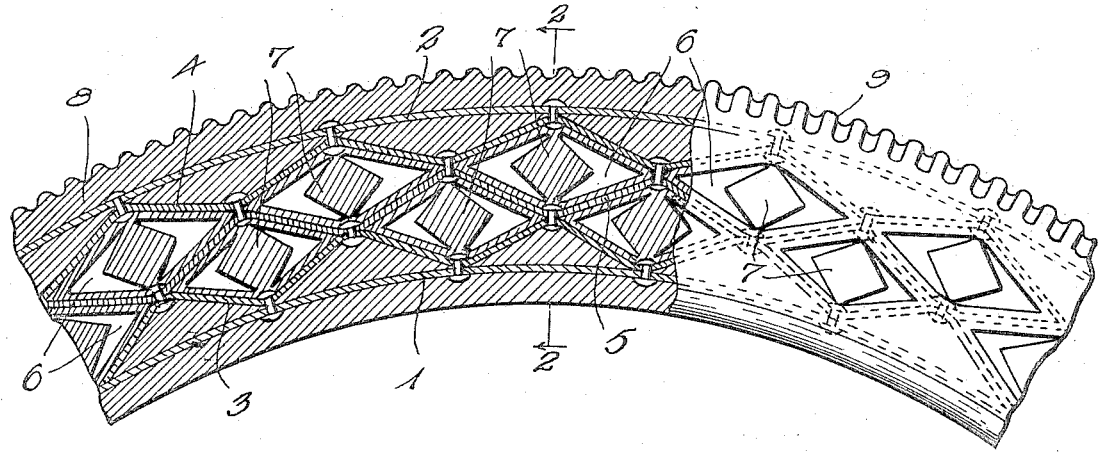
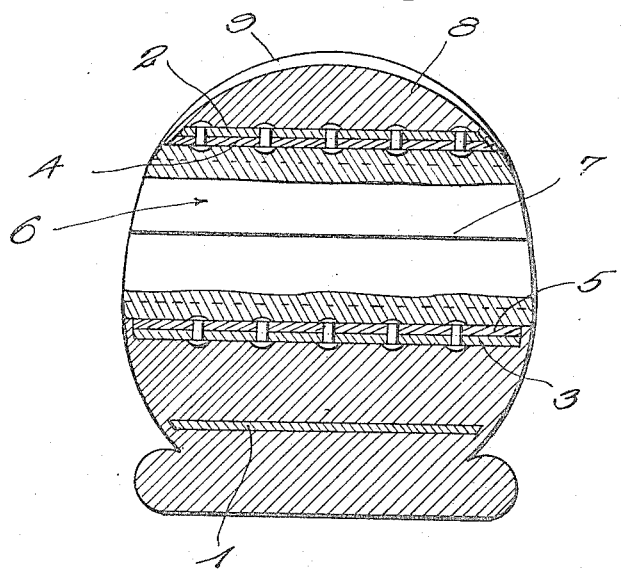
Witness
George W. Giovanetti
Inventor
L. W. Ostmann
By H. B. Willson & Co.
Attorneys

UNITED STATES PATENT OFFICE.

LOUIS WM. OSTMANN, OF ST. CHARLES, MISSOURI.

CUSHION-TIRE.

1,343,154.　　　　Specification of Letters Patent.　　Patented June 8, 1920.

Application filed August 11, 1919. Serial No. 316,628.

*To all whom it may concern:*

Be it known that I, LOUIS W. OSTMANN, a citizen of the United States, residing at St. Charles, in the county of St. Charles and State of Missouri, have invented certain new and useful Improvements in Cushion-Tires; and I do declare the following to be a full, clear, and exact description of the invention, such as will enable others skilled in the art to which it appertains to make and use the same.

This invention relates to certain new and useful improvements in cushion tires.

The principal object of the invention is to provide a cushion tire which has desirable pneumatic qualities without the use of inner tubes and valves and which is not subject to puncture.

Another object of the invention is to provide a cushion tire which is comparatively simple, strong, durable and inexpensive in construction, efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings in which similar reference characters designate corresponding parts throughout the several views, Figure 1 is a view of a portion of a tire constructed in accordance with this invention, showing it partly in longitudinal section and partly in side elevation, and Fig. 2 is a transverse sectional view of the tire taken substantially on the plane indicated by the line 2—2 of Fig. 1.

Referring more particularly to the drawings, the numerals 1 and 2 designate inner and outer spaced circular bands respectively. These bands 1 and 2 are made of suitable flexible material, preferably canvas.

The numerals 3 and 4 represent inner and outer continuous sinuous bands respectively, which are also made of canvas or other suitable flexible material. These sinuous bands 3 and 4 are disposed between the circular bands 1 and 2 and arranged in respective parallel relation, that is, they are arranged so that the corresponding portions of their curves occupy corresponding circumferential positions with respect to the circular bands 1 and 2. The inner portions of the inner sinuous band 3 are riveted or otherwise suitably secured to the circular band 1, and the outer portions of the sinuous band 4 are similarly secured to the outer circular band 2, the points of connection of the sinuous bands with the circular bands being arranged in staggered relation.

Disposed between the sinuous bands 3 and 4 is an intermediate continuous sinuous band 5, the latter being also made of canvas or other suitable flexible material, and being arranged with its curves arranged opposite to the similar curves of the bands 3 and 4. The inner portions of the band 5 are riveted or otherwise suitably secured to the outer portions of the band 3 and the outer portions of the band 5 are similarly secured to the inner portions of the band 4. This forms substantially diamond-shaped openings 6 between the sinuous bands 3, 4 and 5, these openings extending transversely of the tire as clearly shown in Fig. 2 of the drawings.

The numeral 7 designates diamond-shaped blocks of rubber or other suitable cushioning material secured at opposite corners between the inner sinuous band 3 and the intermediate sinuous band 5 to the respective inner and outer portions of the curves of the same, and between the intermediate sinuous band 5 and outer sinuous band 4 to the respective inner and outer portions of the curves of these bands. The blocks 7 are smaller in cross section than the area of the openings 6 so as to permit them to be compressed as the width of the openings are decreased, such action taking place when pressure is applied to the tire.

The various bands of the tire are coated with rubber so as to protect them from moisture or the like, and the spaces between the inner circular band 1 and inner sinuous band 3 and the outer circular band 2 and outer sinuous band 4 are filled with rubber. At the same time the outer circular band 2 is formed with a tread surface 8 which is preferably provided with transversely extending ridges 9 to form an anti-slipping surface for the tire, but which if desired may be left entirely plain.

It will be seen that a tire constructed as above described will possess a great amount of resiliency, but will not easily get out of order as there are no puncturable pneumatic inner tubes, and neither are there inflating valves.

Various changes in form, proportion and in the minor details of construction may be resorted to without departing from the spirit of the invention as defined in the claims.

What is claimed is:

1. A cushion tire including spaced inner and outer circular flexible bands, inner and outer continuous sinuous flexible bands disposed between said circular bands and secured in staggered relation at their inner and outer portions respectively to said inner and outer circular bands respectively, an intermediate continuous sinous flexible band disposed between said sinuous bands and secured at its inner and outer portions to the outer and inner portions respectively of said inner and outer sinuous bands respectively, and cushion blocks disposed between said inner and intermediate sinuous bands and said intermediate and outer sinuous bands.

2. A cushion tire including spaced inner and outer circular flexible bands, inner and outer continuous sinuous flexible bands disposed between said circular bands and arranged in respective parallel relation, the inner and outer portions of said inner and outer sinuous bands respectively being secured in staggered relation to said inner and outer circular bands respectively, an intermediate continuous sinuous flexible band disposed between said sinuous bands and arranged with its curves arranged opposite to the curves of the latter, the inner and outer portions of said intermediate band being secured to the outer and inner portions respectively of said inner and outer sinuous bands respectively, and cushion blocks disposed between said inner and intermediate sinuous bands and said intermediate and outer sinuous bands.

3. A cushion tire including spaced inner and outer circular flexible bands, inner and outer continuous sinuous flexible bands disposed between said circular bands and arranged in respective parallel relation, the inner and outer portions of said inner and outer sinuous bands respectively being secured in staggered relation to said inner and outer circular bands respectively, an intermediate continuous sinuous flexible band disposed between said sinuous bands and arranged with its curves arranged opposite to the curves of the latter, the inner and outer portions of said intermediate band being secured to the outer and inner portions respectively of said inner and outer sinuous bands respectively, and diamond shaped cushion blocks secured at opposite corners between said inner and intermediate sinuous bands to the respective inner and outer portions of the curves of the same, and between said intermediate and outer sinuous bands to the respective inner and outer portions of the curves thereof.

4. A structure as specified in claim 1, the bands being of fabric and coated with rubber.

In testimony whereof I have hereunto set my hand.

LOUIS WM. OSTMANN.